United States Patent [19]
Mathews

[11] 3,752,566
[45] Aug. 14, 1973

[54] PD RULE

[76] Inventor: Thomas E. Mathews, 3½ N. Main St., Three Rivers, Mich. 49093

[22] Filed: July 9, 1971

[21] Appl. No.: 161,138

[52] U.S. Cl. .......................... 351/5, 33/88, 33/103, 33/200
[51] Int. Cl. ............................ A61b 3/10, G01c 9/20
[58] Field of Search .................... 351/5; 33/88, 103, 33/200

[56] References Cited
UNITED STATES PATENTS

| | | | |
|---|---|---|---|
| 2,677,894 | 5/1954 | Belgard | 33/200 |
| 2,491,312 | 12/1949 | Henry et al. | 351/5 X |
| 533,200 | 1/1895 | Nuhn | 33/88 |
| 3,242,578 | 3/1966 | Moll | 33/88 |
| 307,321 | 10/1884 | Osborn | 33/103 |
| 3,371,423 | 3/1968 | Paul | 33/103 |
| 1,263,713 | 4/1918 | Smith | 33/200 X |
| 3,522,657 | 8/1970 | Metrulis | 33/88 |
| 1,633,854 | 6/1927 | Frantz | 33/88 |

FOREIGN PATENTS OR APPLICATIONS
1,016,113  11/1952  France .................................. 351/5

Primary Examiner—David Schonberg
Assistant Examiner—Paul A. Sacher
Attorney—Woodhams, Blanchard and Flynn

[57] ABSTRACT

A pupillary distance measuring device having an elongated rule of finite length with at least one straight edge thereon. A pupillary distance measuring scale is provided adjacent the straight edge and extends longitudinally thereof. Gauge means is provided on the elongated rule and extends transversely of the straight edge for measuring an enatomically high eye. Thus, the practitioner can place the straight edge of the elongated rule in close proximity to the eyes of a patient, whose head is in an upright position, and in a horizontally aligned condition so that the gauge means will indicate the magntidue of an anatomically high eye.

7 Claims, 8 Drawing Figures

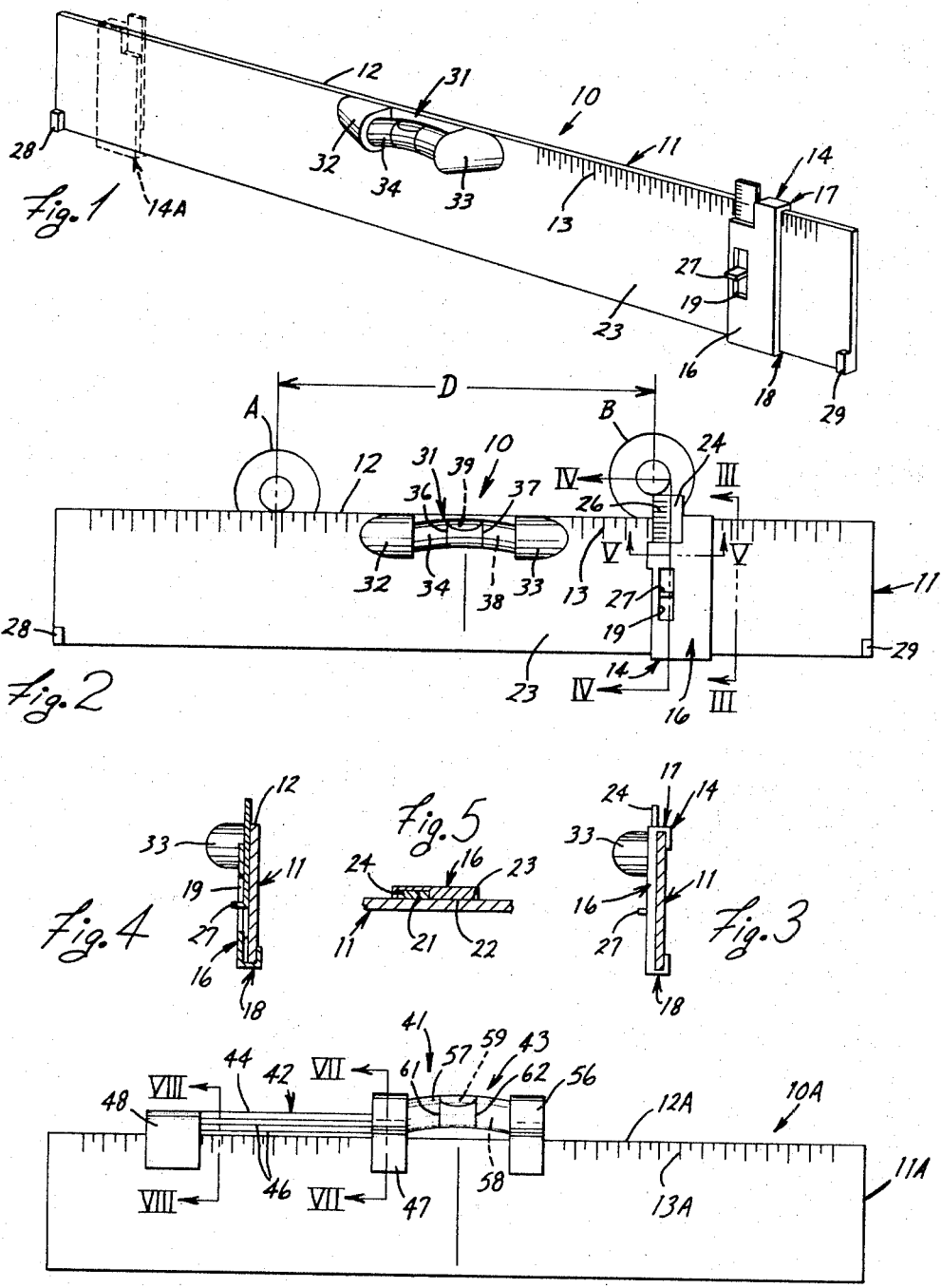

PD RULE

FIELD OF THE INVENTION

This invention relates to a pupillary distance measuring device and, more particularly, relates to an improvement in pupillary distance measuring devices which permits a practitioner to measure the magnitude of an anatomically high eye.

BACKGROUND OF THE INVENTION

Pupillary distance measuring devices have been known in the art for a long period of time. The use of a pupillary distance measuring device depended a great deal on the skill of the practitioner to accurately measure a patient's eyes for the purpose of fitting same with lenses, particularly bifocal lenses. A skilled practitioner is usually capable of detecting an anatomically high eye, that is, an eye which is slightly higher in elevation than the other eye, and can immediately estimate the magnitude of the anatomically high eye. Heretofore, however, expensive equipment was required in order to accurately measure the anatomically high eye and it was always necessary to place the patient in a special room in the office containing the expensive piece of equipment. It usually is not financially practical for a practitioner to have more than one of these expensive machines in his office for the purpose of measuring persons for an anatomically high eye. Accordingly, a light weight and portable pupillary distance measuring device having the capability of accurately measuring for an anatomically high eye is highly desirable.

Most practitioners skilled in the art of measuring eyes usually carry what they refer to as a "PD Rule," otherwise known as a pupillary distance rule, in the vest pocket of the coat worn during office hours. However, the known pupillary distance measuring devices which are of a sufficiently light weight as to be placed in the coat pocket does not have the capability of measuring for an anatomically high eye. Accordingly, a device which is light in weight and is capable of being placed into a vest pocket of an article of clothing worn by the practitioner is highly desirable.

There has been a long need for a pupillary distance measuring device which permits a measurement of the pupillary distance as well as an accurate measurement of the anatomically high eye. I have noticed that a majority of people have an anatomically high eye. The magnitude of difference in height of the eyes is, in many cases, insufficient to warrant, in persons wearing bifocal lenses, the elevation of one bifocal higher than the other. However, if the magnitude is sufficient, it is necessary to make one bifocal higher than the other so that the eyes of the patient will strike each bifocal line at the same instant in time. This measurement becomes even more critical when the eyes are fitted with trifocal lenses, graduated power lenses, that is, those lenses with no trifocal or bifocal line that is visible. Further, it is sometimes necessary, in those persons which do not require bifocal or trifocal lenses, to permit the practitioner to measure the displacement in optical centers for the lenses. Accordingly, and as stated above, a portable device for measuring for an anatomically high eye is highly desirable.

Therefore, the objects of this invention include:

1. To provide a measuring device for measuring the magnitude of an anatomically high eye.

2. To provide a pupillary distance measuring device having gauge means thereon for measuring the magnitude of an anatomically high eye.

3. To provide a pupillary distance measuring device which is light weight and may be carried in the pocket of a practitioner so that same will be readily available at all times for use with a patient.

4. To provide a pupillary distance measuring device which is inexpensive to manufacture.

5. To provide a pupillary distance measuring device having level indicating means thereon for orienting the device so that the straight edge thereof is horizontally aligned to assist in the measurement of the anatomically high eye.

6. To provide a level indicating device for attachment to existing pupillary distance measuring devices.

Other objects and purposes of this invention will become apparent to persons skilled in this general art upon a reading of the following specification and inspecting the accompanying drawing, in which:

FIG. 1 is a perspective view of a pupillary distance measuring device embodying the invention;

FIG. 2 is a front elevational view of the pupillary distance measuring device positioned in association with the eyes A and B of a patient;

FIG. 3 is a sectional view taken along the line III—III of FIG. 2;

FIG. 4 is a sectional view taken along the line IV—IV of FIG. 2;

FIG. 5 is a sectional view taken along the line V—V of FIG. 2;

FIG. 6 is a front elevational view of a modified pupillary distance measuring device;

FIG. 7 is a sectional view taken along the line VII—VII of FIG. 6; and

FIG. 8 is a sectional view taken along the line VIII—VIII of FIG. 6.

Certain terminology will be used in the following descriptive material for convenience in reference and is not to be limiting. The words "up," "down," "left" and "right" will refer to directions in the drawing. The words "in" and "out" will refer to the geometric center of the device and parts associated therewith. Such terminology will include derivatives and words of similar import.

SUMMARY OF THE INVENTION

The objects and purposes of this invention are met by providing a pupillary distance measuring device comprising an elongated rule of finite length and having at least one straight edge and a pupillary distance measuring scale adjacent the straight edge and extending longitudinally thereof. Gauge means are mounted on the elongated rule and extend transversely of the straight edge for measuring the magnitude of an anatomi-cally high eye.

DETAILED DESCRIPTION

A pupillary distance measuring device 10 (FIGS. 1 to 5) comprises an elongated rule 11 of finite length and having a constant thickness throughout the longitudinal length thereof. The elongated rule 11 has at least one straight edge 12 and a pupillary distance measuring scale 13 located in close proximity to the straight edge. The scale 13 may be in inches and/or millimeters for the purpose of measuring the distance between the eyes of a patient. The foregoing structure is old in the art and is not considered novel.

A slider 14 is slideably mounted adjacent one end of the rule 11. More particularly, the slider 14 comprises a plate 16 having hooklike elements 17 and 18 connected to the upper and lower edges, respectively, thereof, which hooklike elements 17 and 18 engage the upper and lower edges of the rule 11 to secure the plate 16 to the rule 11 for sliding movement longitudinally thereof. An elongated opening 19 is provided in the plate 16. A track 21 (FIG. 5) is provided on the plate 16 in the surface 22 thereof which slideably engages the front surface 23 of the rule 11. A measuring scale 24 having measuring indicia thereon, as millimeter divisions, is slideably disposed within the track 21 for vertical movement between a position housed within the track 21 between the plate 16 and the front surface 23 of the rule 11 and an extended position as illustrated in FIG. 2 wherein the upper portion of the scale 24 extends perpendicularly to the straight edge 12 of the rule 11. A tab 27 is formed on the lower end of the scale 24 and projects through the opening 19 in the plate 16 to facilitate a movement of the scale between the aforementioned positions. A second slider 14A is provided on the opposite end of the rule 11 to facilitate the measurement of the other eye of the patient.

Tabs 28 and 29 are formed on opposite ends of the rule 11 to permit the sliders 14 and 14A from sliding off the ends of the rule 11.

A level indicating device 31 is secured to the rule 11, here the front face 23, and is generally centrally located thereon. The level indicating device 31 comprises a pair of horizontally spaced brackets 32 and 33 secured to the rule 11 and support a transparent arcuate, tubular housing member 34 made of glass or plastic. The housing 34 is curved about an axis extending perpendicular to the plane of the rule 11. A pair of longitudinally spaced lines 36 and 37 are provided on the housing 34 and the lines 36 and 37 are generally equally spaced from a vertical line passing through the axis of the radius of curvature of the housing 34. A liquid is provided in the housing 34. A bubble 39 is provided within the liquid and has a longitudinal length generally equal to the longitudinal spacing between the lines 36 and 37. That is, when the bubble 39 is located between the lines 36 and 37, the straight edge 12 of the rule 11 will be generally horizontally aligned.

OPERATION

Although the use of the above described device will be apparent to persons skilled in the general area of pupillary distance measuring devices, a brief summary thereof will be given for convenience.

In determining the spacing between the eyes A and B of a patient, the normal instrument which is utilized for this purpose is a conventional pupillary distance measuring device, which consists of an elongated rule having a measuring scale printed thereon. This invention includes such a rule 11 and measuring scale 13 for measuring the pupillary distance D between the eyes A and B. However, and heretofore unknown as far as I am aware, it was not possible to measure the magnitude of an anatomically high eye with portable type equipment. I have discovered, however, that a slider member 14, provided with a scale 24, can be moved along the pupillary distance rule 11 so that the left edge becomes aligned with an imaginery vertical line passing through the pupil of one of the eyes, such as eye B illustrated in FIG. 2. Since the vertical orientation of a patient's head is readily discernible by a skilled practitioner, a placement of the pupillary distance rule 11 so that the straight edge 12 is tangent to the lower edge of the pupil of eye A, for example, and the bubble is made to lie between the lines 36 and 37, the scale 24 may be extended from the slider 14 so that the scale indicia 26 thereon is readily visible by the practitioner. The practitioner may then read the number of scale divisions 26 on the scale 24 and accuragely measure the magnitude of the anatomically high eye, that is, the distance from the straight edge 12 to the lower edge of the pupil of eye B.

If eye A was the anatomically high eye, the second slider 14A could be utilized for the same purpose as described above with respect to slider 14.

MODIFICATIONS

A modified pupillary distance measuring device 10A is illustrated in FIGS. 6 through 8. The pupillary distance measuring device 10A comprises an elongated rule 11A having a finite length and at least one straight edge, such as straight edge 12A. A pupillary distance measuring scale 13A is provided closely adjacent the straight edge 12A for the purpose of measuring the pupillary distance D. The foregoing described pupillary distance measuring device 10A is known in the art and is not considered as novel.

However, I have discovered that a measuring and indicating attachement 41 may be releasably secured to the straight edge portion 12A of the rule 11A for the purpose of measuring the magnitude of an anatomically high eye. The measuring and indicating attachment 41 comprises a transparent measuring scale 42 which consists of a transparent strip 44 having a plurality of graduated and parallel lines 46 thereon extending generally parallel to the straight edge 12A. The lines 46 extend outwardly away from the straight edge 12A in a predefined manner so that the lines represent an increment of measurement relative to the straight edge 12A such as inches or millimeters. The transparent strip 44 is secured to a bracket 47 at one end and to a bracket 48 at the opposite end. The bracket 47 comprises an enlarged head portion 49 and a pair of flanges 51 and 52 which are adapted to straddle the straight edge portion of rule 11A. The spacing between the flanges 51 and 52, at least adjacent the free ends thereof, is preferably slightly less than the thickness of the rule 11A so that the flanges 51 and 52 will securely grip the rule 11A. The bracket 48 is generally similar to the bracket 47 except that the bracket 48 does not have an enlarged head, such as the head 49 on the bracket 47. The bracket 48 has a pair of flanges 53 and 54 which are adapted to straddle the rule 11A in the same manner as the flanges 51 and 52 on the bracket 47.

A bracket 56 identical to the bracket 47, is horizontally spaced along the straight edge 12A of the rule 11A and is secured thereto by the same type of flange structure as exists on the bracket 47. A transparent, arcuate, tubular housing 57 is secured to and extends between the brackets 47 and 56. The housing contains a liquid 58 having a bubble 59 therein. A pair of longitudinally spaced lines 61 and 62 are provided having a spacing generally equal to the longitudinal to the bubble 59.

In use, the attachment 41 may be attached to the straight edge 12A of the rule 11A by pushing the brackets 47, 48 and 56 over the straight edge 12A so that the flanges thereof will securely grip the rule 11A. The lower edge of the transparent strip 44 and the bottom of the groove defined by the horizontally spaced flanges on the brackets 47 and 48, as well as the bracket 56 will serve to align the level indicating device 43 relative to the straight edge 12A. Thus, the practitioner may place the rule 11A in close proximity to the eyes of a patient, as illustrated in FIG. 2, and locate the straight edge 12A tangentially to the lower edge pupil of eye B, in this case so that the transparent strip 44 will be located in close proximity to the anatomically high eye A. The practitioner may then view through the transparent strip 44 the pupil of the anatomically high eye to detect the magnitude thereof.

The pupil diameter of one eye relative to the other may vary from one person to the next but, the majority of the people have pupils which are the same diameter. If the pupils are of different diameter, the skilled practitioner can easily detect this difference and be able to compensate for this. In fact, he may choose to use the lower edge of each iris as points of reference rather than the pupils.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A pupillary distance measuring device, comprising:
    an elongated, thin and rectangularly shaped rule of finite length having at least one straight edge and a pupillary distance measuring scale adjacent said straight edge and extending longitudinally thereof;
    at least one slider means slidably mounted on said rule for movement longitudinally thereof, said slider means having a measuring scale and means defining a housing for said measuring scale;
    support means on said slider means for supporting said measuring scale for transverse extension and retraction movement relative to said straight edge, said extension movement being to a limit beyond said straight edge and said retraction movement being to a limit wherein said measuring scale is completely housed within said housing means;
    level indicating means for indicating when said straight edge is horizontally aligned whereby said measuring scale, when retracted, is free of any extending portions beyond the confines of said housing means to thereby facilitate a convenient and lengthwise receipt of said measuring device in a pocket of a practitioner, said straight edge being positionable in close proximity by said practitioner to the eyes of a patient whose head is in an upright position and said eyes are maintained in a horizontally aligned condition so that said measuring scale, when extended, will project beyond said straight edge to measure the magnitude of said anatomically high eye.

2. A pupillary distance measuring device according to claim 2, including a pair of said slider means, one slider means being slidably mounted on said rule adjacent one end thereof and the other of said slider means being slideably mounted on said rule adjacent the other end thereof.

3. A pupillary distance measuring device according to claim 1, wherein said level indicating means is fixedly secured to said rule near the center thereof and projects laterally outwardly from a side face of said rule.

4. A pupillary distance measuring device according to claim 1, wherein said level indicating means comprises a transparent, arcuate tubular housing curved about an axis extending perpendicular to the plane of said rule, said transparent, arcuate tubular, housing having a pair of longitudinally spaced lines and houses a liquid and a bubble therein; and
    including a pair of longitudinally spaced brackets secured to said rule and extending laterally sidewardly from a side face of said rule, said tubular housing being secured to and extending between said brackets.

5. A pupillary distance measuring device, comprising:
    an elongated, thin, planar and rectangularly shaped rule of finite length having at least one straight edge and a pupillary distance measuring scale adjacent said straight edge and extending longitudinally thereof;
    means defining a transparent strip extending longitudinally of said rule, said transparent strip means having securement means thereon for securing said transparent strip to said rule, said transparent strip means having a plurality of graduated parallel lines thereon extending parallel to said straight edge and spaced laterally outwardly from said straight edge and coplanar with the plane defined by said rule whereby said straight edge and said transparent strip means are positionable in close proximity to the eyes of a patient whose head is in an upright position and maintained in a horizontally aligned condition so that a practitioner can view an eye through said transparent strip means while aligning the other eye with said straight edge to indicate the magnitude of an anatomically high eye, said parallell lines serving to measure the difference in height between the eyes; and
    level indicating means connected to said transparent strip for indicating when said straight edge is horizontally aligned.

6. A pupillary distance measuring device according to claim 5, wherein said transparent strip means is releasably connected to said rule.

7. An attachment for an elongated thin and planar pupillary distance measuring rule of finite length having at least one straight edge and a pupillary distance measuring scale adjacent said straight edge and extending longitudinally thereof, comprising:
    level indicating means; and
    bracket means secured to said level indicating means for securing said level indicating means to said pupillary distance measuring rule so that the central axis of said level indicating means is coplanar with said rule, said bracket means securing said level indicating means to said rule so that the relationship between said straight edge and said level indicating means is always fixed, said level indicating means also including a transparent strip secured to said bracket means and extending in a coplanar relationship to the plane of said rule, said transparent strip having a plurality of parallel lines thereon extending parallel to said straight edge, said paralell lines serving to measure the difference in height between the eyes.

* * * * *